May 29, 1934.    F. BELLINGROTH    1,960,367
DOUGH PORTIONING AND MOLDING MACHINE WITH
KNEADING DEVICE CONNECTED THERETO
Filed March 25, 1931    4 Sheets-Sheet 4

Inventor:
Friedrich Bellingroth

Patented May 29, 1934

1,960,367

UNITED STATES PATENT OFFICE 1,960,367

DOUGH PORTIONING AND MOLDING MACHINE WITH KNEADING DEVICE CONNECTED THERETO

Friedrich Bellingroth, Runderoth-Schnellenbach, Germany

Application March 25, 1931, Serial No. 525,210

5 Claims. (Cl. 107—4)

Machines for portioning and shaping dough are known in various types of construction. None of these machines have, however, proved satisfactory in practice, as the objections were too obvious, for example the unnecessarily heavy pressing of the dough when being introduced into the portioning chambers which impairs the leavening effect, and also unsuitability of the machine for tough doughs and finally the insufficient supply of lubricant.

These disadvantages are overcome in a practical manner according to the invention. Moreover a kneading device is directly connected to the machine and imitates in a natural manner the movement of the hand when kneading.

Figure 1:
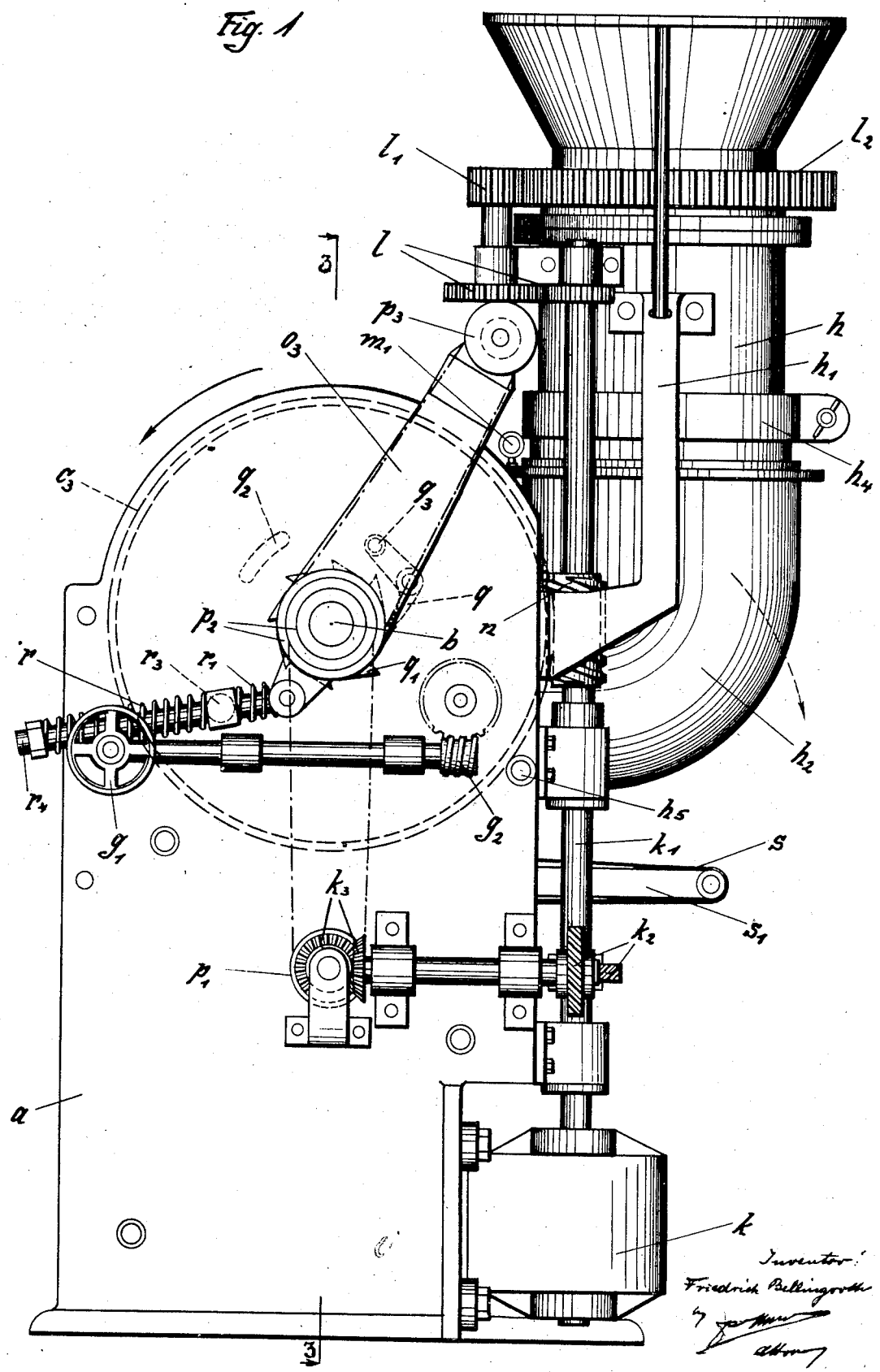
Figure 2:
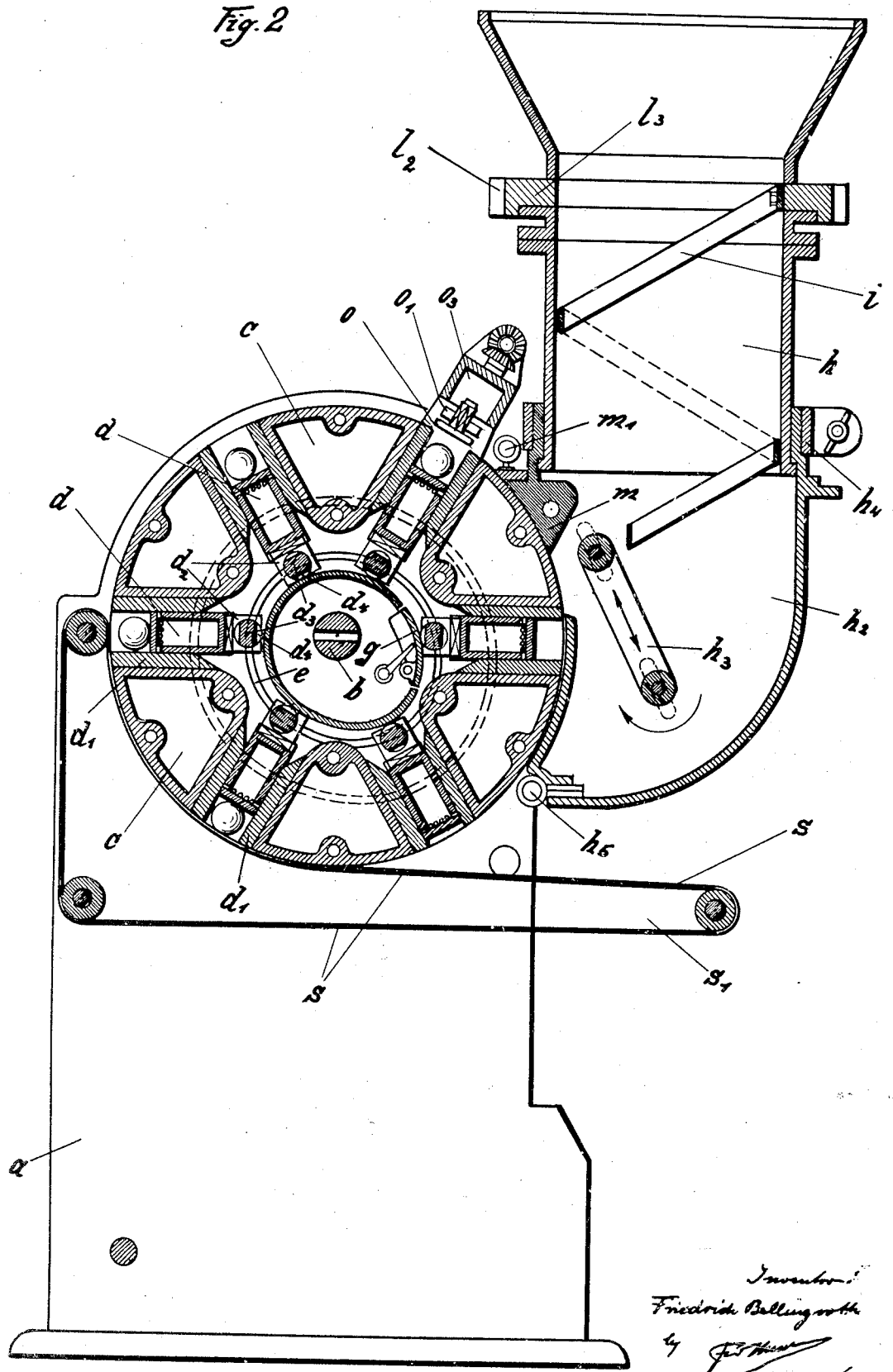
Figure 3:
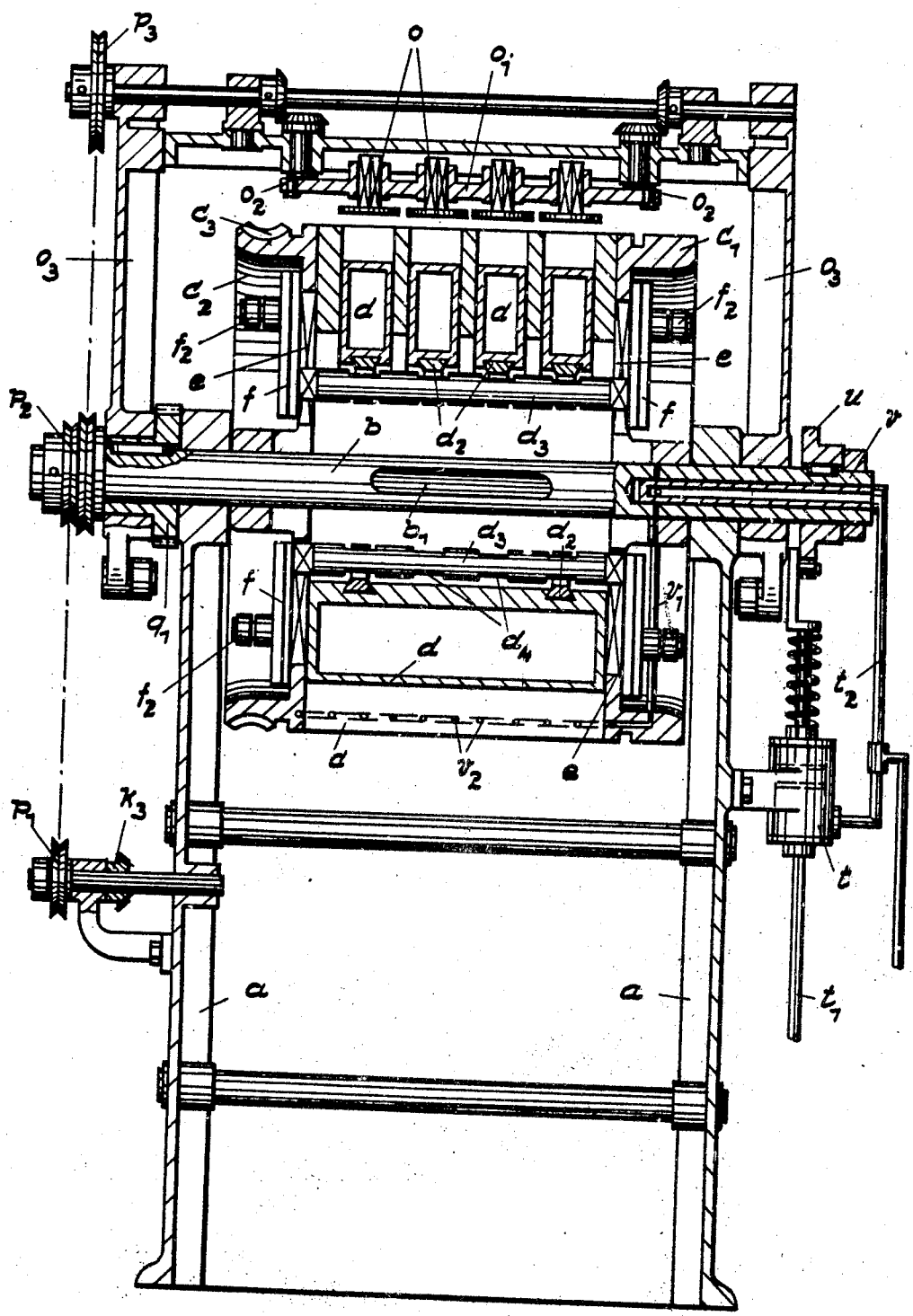
Figure 4:
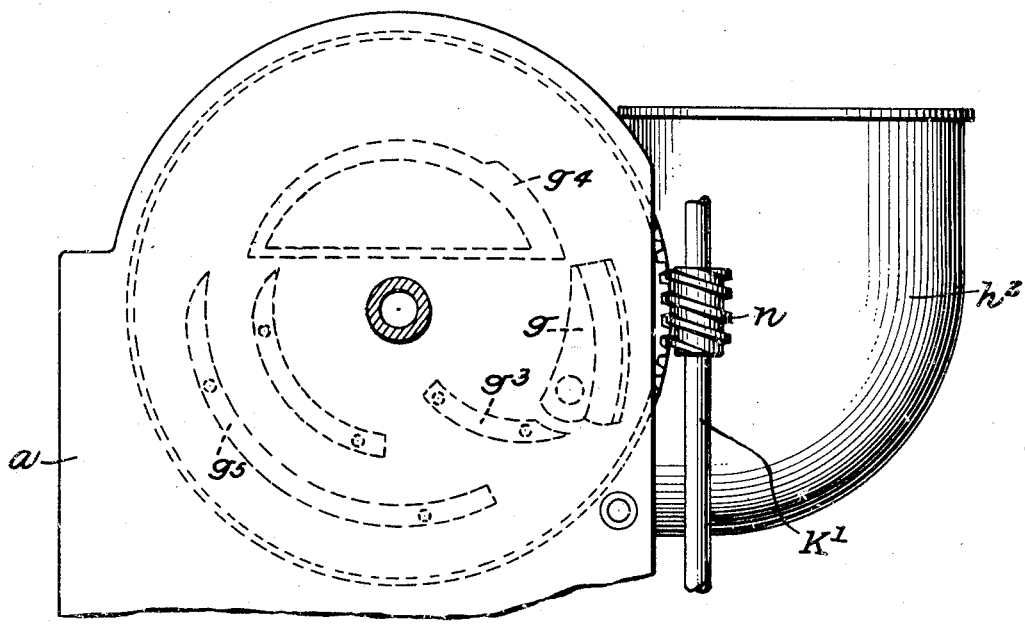
Figure 5:
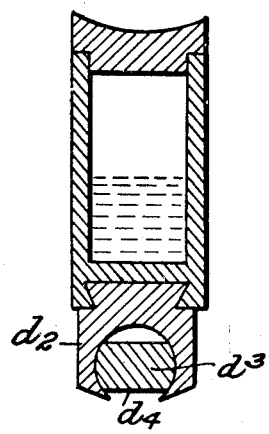
Figure 6:
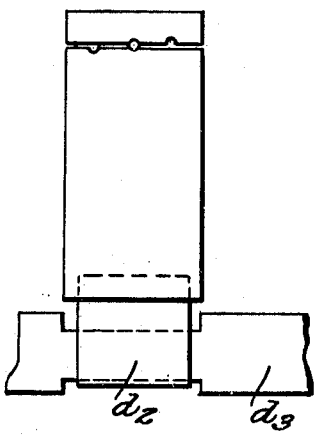

An embodiment of the invention is illustrated by way of example in the accompanying drawings in which:

Fig. 1 shows the machine in elevation.
Fig. 2 is a vertical section of Fig. 1.
Fig. 3 is a section on line 3—3 of Fig. 1.
Fig. 4 is a part elevation view showing the drum with the cams thereon.
Fig. 5 shows one of the inserts in longitudinal section.
Fig. 6 is an elevation of one of the inserts taken at right angles to Fig. 5.

A shaft $b$ is journaled in a frame $a$ and carries a drum. This drum is formed of separate segments $c$ and side plates $c_1$, $c_2$, the plate $c_2$ forming a toothed rim $c_3$. The gaps formed in the drum between the segments $c$ are filled with inserts $d'$ with pistons $d$ shaped according to the kind of baker's ware, which it is desired to produce. The pistons $d$, known in this type of construction, are connected to the connecting rod $d_3$ by fitting pieces $d_2$. The pistons $d$ can be easily removed by turning through 90° the connecting rod $d_3$ which is provided with a slide bar $f$ on each end when the fitting pieces $d_2$ which have an aperture at one end can be shifted over the flattened portions $d_4$ and the pistons removed. The piston rods $d_3$ slide at both ends in square section guides $e$ of the side plates $c_1$ and $c_2$ respectively and are fixed by screws to the slide bars $f$, on which guire rollers $f_2$ are mounted. These guide rollers $f_2$ run over guides. A dough adjusting cam $g$ regulates the quantity supplied to the chambers. The adjusting is effected by a hand wheel $g_1$ through the intermediary of a worm $g_2$. This cam is oscillatably mounted so that a perfect feeding without pressing of the dough, accommodated in the portioning chamber, to the kneading plates $o$ is ensured according to the size of the inserted fitting pieces $d'$ or of the corresponding piston $d$.

Besides the above mentioned cam $g$, three further cams are fixed by screws on the inner side of the frame $a$. The cam $g^3$ is fitted for safety and positively returns the rollers into their extreme outer position in the event of irregularities in the working, that is if the piston should be hindered in its movement by any cause, so that, when entering the oscillatable cam $g$, the end of the piston in question is flush with the circumference of the drum.

The cam $g^4$ is exchangeably amounted on the frame $a$ in order to adapt the size of the dough chambers, that is their depth to the dough mass to be worked. The rollers finally run from this cam $g^4$ on to the last cam $g^5$ which likewise prevents the pistons from pressing on the shaped dough during the rotation of the drum. If the shaped dough has however been placed on the band $s$ during the rotation, the cam ceases to act and the rollers and consequently the piston connected thereto can move into their outer initial position by gravity, if necessary assisted by the above mentioned cam $g^3$.

In the case of large loaves, the cam $g^4$ is replaced by a smaller cam. $g^5$ is removed so that the rollers descend with the piston into the chamber when the drum is in suitable position and eject the bread dough.

The drum is rotated by means of a worm rim around its circumference engaging with worm $n$ keyed on a shaft $k_1$ driven by the motor $k$.

A further development of the invention can be best explained by describing the operation:

The hopper $h$ is fixed on the machine frame $a$ by means of brackets $h_1$ arranged one on each side. The lower portion of the hopper can be folded down on a hinge $h_5$. For this purpose a clip like ring $h_4$ is provided which clamps the upper edge of the hopper part $h_2$ in raised position on the hopper part $h$. It is only necessary to unscrew the ring screw and to remove the ring in order to fold down the hopper part $h_2$.

In the case of particularly tough doughs the hopper $h$ comprises further a coreless dough worm $i$ journaled by means of a ring $l_3$ on the stationary hopper $h$ and designed to press the dough lightly downwards, an excessively strong pressure being avoided in that the worm is made hollow. The worm $i$ serves for feeding the dough to the drum, and, when pressure centres arise in the exchangeable hopper part $h^2$, these are effectively cut out in that the dough can escape through the hollow middle portion of the worm without being subjected to downward pressure. The drive is derived from the common driving motor $k$ through the intermediary of a shaft $k_1$, a pair of gear wheels $l$ and a pinion $l_1$ on to the toothed rim $l_2$ rigidly mounted on the worm $i$.

An endless band $h_3$ is also arranged in the hopper part $h_2$ and rotated in clockwise direction by means of the shaft $k_1$ or the shaft $b$. The transmission is not shown in the drawings as it is behind the machine and therefore invisible. The dough is conveyed by the endless band $h_3$ in upward direction out of the lower part $h_2$ of the hopper to the cutting off tongue and the excess dough which can no longer enter the dough chambers of the drum is conveyed over the upper end of the band. The band is moreover adjustable in the filling channel towards the cutting off tongue $m$, so that thereby a simple regulation of the dough pressure is possible, which pressure is readable on a pressure gauge $m_1$ mounted at a conspicuous point. The tongue $m$ projects into the inner space of the exchangeable hopper part $h_2$ and is made in one piece therewith. It may be slightly tapered so that it presents an acute angle in the direction towards the dough in the hopper part and bears, with its surface conforming to the shape of the casing of the drum, against same. When a sufficient quantity of dough has been filled into the dough chambers by this arrangement and by the rotation of the dough drum, and the excess dough is held back in the dough hopper by the preferably heated cutting off tongue $m$, the portions of dough come within the working range of the kneading device. This device consists preferably of heated plates $o$, heated for example by an electric resistance, all arranged on a kneading beam $o_1$. The dough in the measuring pockets is brought into contact with the plates $o$ in known manner by cam races. The cam races act on the guide rollers $f_2$ and the connecting rod $d_3$ influences the piston $d$ through the intermediary of the slide bars $f$ in such a manner that at the points, at which the working of the dough is to commence, the dough is fed to the kneading device or plates $o$. A movement is communicated to the kneading beam $o_1$, moved by cams $o_2$ which are preferably mutually displaced, which is similar to the movement of a hand when kneading. The cams $o_2$ are also driven from the motor $k$ through the intermediary of a pair of worm wheels $k_2$, a pair of bevel wheels $k_3$ and rope pulleys $p_1$, $p_2$ and $p_3$. The kneading device is connected by lateral stays $o_3$ with the shaft $b$ and oscillatable thereon. The elements $q$, $q'$ and $q^2$ serve for operating and disengaging the kneading device. The ratchet wheel $q'$ is keyed on the shaft $b$ thus participating in its rotation and actuates along the pawl $q$ which is oscillatable on the lateral stays $o_3$ of the kneading device and causes the entire kneading device to rotate when the pawl $q$ is in engagement with the ratchet wheel $q'$, until the other free end $q^3$ of this pawl $q$ comes into contact with an abutment $q^2$ rigidly mounted on the machine frame and is thereby disengaged from the ratchet wheel $q'$. When the kneading device has participated in the movement of the drum and during this movement the arm $q^3$ of the pawl $q$ has come into contact with the abutment $q^2$ as above described, the free arm $q^3$ is oscillated by this abutment $q^2$ so that the entire kneading device is subjected to the action of a spring $r$. This is the oscillating movement of the device for kneading the dough. A projection on the hub of the lateral stay $o_3$ participates in this oscillating movement and is hingedly connected to a bolt $r_4$ guided in a pivot pin $r_3$. A spring $r$ is arranged on the outer end of the bolt $r_4$ and is put under tension by this oscillating movement and returns the kneading device into its initial position as soon as the pawl $q$ disengages from the ratchet wheel $q'$, a counter spring $r_1$ on the other end of the bolt $r_4$ cushioning the returning movement of the kneading device.

The kneaded dough wares are gripped by a conveyor band $s$, when the drum is in the lowest position, they can be easily removed by a depositing arm $s_1$. The conveyor band $s$ is preferably pulled along in horizontal direction up to the periphery of the drum.

The lubricant absolutely necessary for the kneading is supplied by an oil pump $t$ driven by a cam disc $u$ keyed on shaft $b$. The lubricant is sucked through a conduit $t_1$ and forced by means of the pump $t$ through a conduit $t_2$ into a fitted piece $v$ in the bored portion of shaft $b$. A conduit $v_1$ connects the fitted piece $v$ with the portionizer chambers in which bores $v_2$ allow the lubricant to finely distribute over the boundary faces of the portionizer chambers. The fitted piece $v$ is rigidly connected to the lubricating conduit and fitted in a recess in the shaft $b$. It does not rotate but the shaft rotates around this fitted piece $v$ with the complementary connection in the conduit for the lubricant. The machine shaft $b$ has a slot $b_1$, which serves to conduct into the drum heat which is produced for example by a heating element in the interior of the hollow shaft $b$ into the drum. Thus, in the case of badly heated baking rooms, the heat is preserved in the dough in the portionizer chambers.

I claim:—

1. A dough portioning and molding machine, comprising in combination with a machine frame, a shaft journalled in said frame, a drum formed of segments and of two plates mounted on said shaft, a hopper on one side of said frame adapted to supply the dough to said drum, exchangeable pistons in said drum adapted to shape the dough in the space between said segments, lateral stays oscillatably mounted on said shaft, a kneading device consisting of heated plates carried by said stays adapted to cooperate with said pistons to knead the dough in said drum, a ratchet wheel keyed on said shaft, an elbow lever oscillatably mounted on one of said lateral stays, a pawl on one arm of said elbow lever adapted to engage said ratchet wheel to operate said kneading device, and a stop on said frame adapted to coact with the other arm of said lever to disengage said pawl from said ratchet wheel.

2. A dough portioning and molding machine as specified in claim 1, comprising in combination with the drum composed of spaced segments and the pistons, insert pieces in the gaps between said segments, adapted to cooperate with said pistons to shape the dough portions, a common piston rod having flattened portions one for each piston, and a fitted piece on the inner end of each piston adapted to detachably engage over the corresponding flattened portion of said common piston rod.

3. A dough portioning and molding machine, as specified in claim 1, comprising in combination with the machine frame the shaft bored over a certain portion of its length and the dough portionizer chambers, a pump for lubricant fixed on said machine frame, a fitted piece in said bored shaft adapted to receive the lubricant from said pump, and an oil conduit communicating with said fitted piece and having bores adapted to supply the lubricant to said dough chambers.

4. A dough portioning and molding machine, as specified in claim 1, comprising in combination with the filling hopper composed of a stationary top part and of an interchangeable lower part, a rotatable worm in said stationary hopper part adapted to press the dough downwards in said hopper, an endless conveyor band in said lower hopper part adapted to coact with said worm to exert pressure on the dough, rolls for moving said conveyor band, a cutting tongue in said lower hopper part adapted to cut off the quantity of dough necessary for working and hold back any excess quantity thereof, means for adjusting said conveyor band with regard to said cutting tongue in order to regulate the dough pressure, and a pressure gauge on said lower hopper part adapted to indicate the pressure exerted on the dough in said hopper.

5. A dough portioning and molding machine, as specified in claim 1, comprising in combination with the shaft, the dough drum and the filling hopper, a worm in said hopper adapted to feed the dough to said drum, a kneading device on said shaft adapted to knead the dough in said drum, a pump for feeding lubricant to said dough drum, and an electric motor adapted to drive all these elements.

FRIEDRICH BELLINGROTH.